United States Patent
Lee

[15] 3,668,469
[45] June 6, 1972

[54] MONITOR FOR RECEPTACLE WITH TWO OR THREE CONTACTS

[72] Inventor: Joo C. Lee, Lindenhurst, Ill.
[73] Assignee: The Safety Company, St. Charles, Ill.
[22] Filed: Dec. 21, 1970
[21] Appl. No.: 100,103

[52] U.S. Cl. .................................... 317/18 D, 317/27 R
[51] Int. Cl. ........................................... H02h 1/02
[58] Field of Search ............ 317/18, 18 D, 18 B, 27, 28, 317/33

[56] References Cited

UNITED STATES PATENTS 3,555,360  1/1971  Lee ................................ 317/18 D
3,374,398  3/1968  Horn .............................. 317/18 X

*Primary Examiner*—William M. Shoop, Jr.
*Assistant Examiner*—Harvey Fendelman

[57] ABSTRACT

A monitoring module associated with a three-contact receptacle injects an RF supervisory signal into the line contact. When a power cable with a two-contact plug is inserted into the receptacle, a ground fault in the electrical equipment served by the cable provides an alternate path to ground for the injected RF supervisory signal thus reducing the RF current flow in the neutral contact. Such reduction is sensed in a differential amplifier and used to disconnect power. When a power cable with a three-contact plug is used, a discontinuity in the ground path reduces the RF current flow in the ground contact due to the injected RF signal. This reduction is sensed and used to disconnect power.

14 Claims, 6 Drawing Figures

INVENTOR.
Joo C. Lee
BY Paul + Paul
ATTORNEYS.

3,668,469

MONITOR FOR RECEPTACLE WITH TWO OR THREE CONTACTS

BRIEF SUMMARY OF THE INVENTION

This invention relates to a monitor capable of detecting ground faults associated with a portable electrical load served by a two-lead power cable, or detecting discontinuities in the connection of such load to the power source ground when the load is served by a three-lead power cable.

Recent efforts to reduce the electrical shock hazard of portable single phase electrical loads, such as motor driven tools and appliances, have resulted in government regulations requiring equipment of this type to come equipped with three-lead power cables. In addition to the line and neutral conductors, a three-lead cable contains a relatively heavy ground conductor, one end of which is connected to the chassis or housing of the load. The other end of the ground conductor is connected to a ground contact in the plug terminating the cable. When such a plug is inserted into a receptacle whose third contact is permanently connected to the power source ground, an uninterrupted low impedance electrical path is established between the chassis and ground. Should coupling develop between the load and the chassis occasioned, for example, by an insulation failure, power current flowing into the chassis is carried away safely to ground by the ground conductor, rather than through the body of a person touching or using the tool or appliance.

This approach to consumer safety works only to the extent that three-lead power cables are properly used. First of all, most existing receptacles, particularly in domestic locations, are of the two-contact (line and neutral) variety, although three-contact receptacles are required in new construction. In the absence of a three-contact receptacle, equipment provided with three-lead cables must be used with an adapter which accepts the three contacts of the cable and provides only the line and neutral contacts for mating with a conventional two-contact single-phase wall receptacle. Such adapter is provided with a pigtail lead connected to the ground contact of the adapter and terminating in a lug which is supposed to be attached by the user to a grounded screw on the front plate of the receptacle to establish a continuous ground path. All too often, the pigtail lead is not used, or the ground contact in the plug of the three-lead cable is clipped-off to eliminate the need for an adapter. In such cases, there is no protection against accidental grounding of the electrical equipment.

Secondly, even the proper use of a three-lead power cable with a three-contact grounded receptacle is not foolproof; and, in fact, may give the user a false sense of security about a potentially dangerous situation arising from a concealed discontinuity in the electrical path between the chassis and ground. When there exists an undetected break in the ground conductor, or a high impedance connection between the conductor and the chassis, the user is unprotected against possibly dangerous electrical shocks should insulation failure occur.

Thirdly, it is simply a fact that a great deal of electrical equipment currently in use is provided with two-lead power cables. Short of replacing the power cables or providing an auxiliary ground conductor for each such piece of equipment, there was, heretofore, very little protection against the occurrence of a "ground fault", which is a term used to denote the external grounding of a piece of defective electrical equipment.

Consumer safety will be enhanced as new electrical equipment incorporating better insulation and new design concepts replaces existing equipment, and as three-contact receptacles become more available. Such approach to future safety, however, can have no effect on the hazards of existing equipment. What is vitally needed, therefore, is an approach that is compatible with existing equipment, and yet protects against the two potentially dangerous situations that may arise when portable electrical equipment is used: (1) the occurrence of a ground fault in equipment powered by a two-lead cable; and (2) the occurrence of a discontinuity in the ground connection in equipment powered by a three-lead cable. It is the primary object of the present invention to provide a monitor that will achieve these results without requiring any modification to the electrical equipment being used.

Briefly, the invention involves incorporating a monitoring module into a wall receptacle capable of receiving either the plug of a two-lead cable and/or the plug of a three-lead cable. Such module includes an RF generator a part of whose output is injected into the line side of the receptacle and the rest of which is compared in a differential amplifier with the RF current flowing in the neutral side of the receptacle. When a two-lead cable is used, the occurrence of a ground fault provides an alternate path for the RF signal formerly flowing in the neutral with the result that less RF current flows through the neutral and the balance of the differential amplifier is upset. A control circuit responds to the unbalance of the amplifier by operating control means which disables a power switch and disconnects power from the receptacle contacts. When a three-lead cable is in use, the coupling between the load and the chassis causes RF current to flow through the ground conductor of the cable into the ground side of the receptacle. A control circuit, sensing the flow of RF current in the ground side of the receptacle permits the control means to enable the power switch until a ground fault and a break in continuity reduces the flow of RF current causing operation of the control means and disabling of the power switch.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

BRIEF DESCRIPTION OF VIEWS OF THE DRAWING

For a more complete understanding of the nature and objects of the invention, reference should be had to the following detailed description taken in connection with the accompanying drawings wherein:

FIG. 3 is a block diagram showing a modification in the manner in which the invention is utilized.

DETAILED DESCRIPTION

Figure 1:
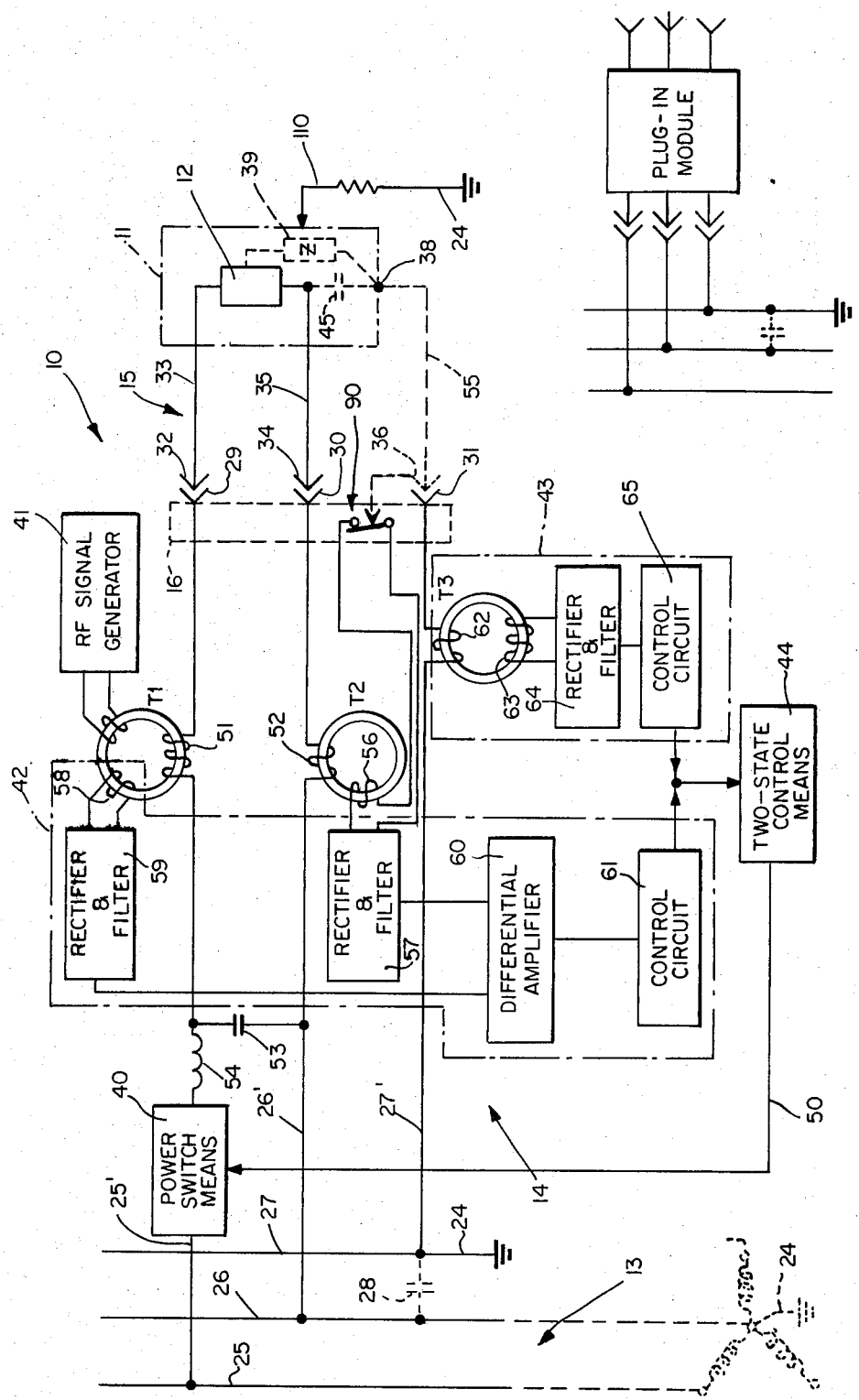
FIG. 1 is a block diagram of the preferred form of the invention.

Referring now to FIG. 1, reference numeral 10 designates a system by which a chassis 11 containing an electrical load 12 is connected to a ground power source 13 through a monitoring module 14 by means of a two-lead power cable 15 plugged into receptacle 16. In the embodiment illustrated in FIG. 1, receptacle 16 is attached to a housing (not shown) in which the components of module 14 are mounted.

Chassis 11 is representative of any type of portable electrical equipment provided with a power cable that can be plugged into a receptacle. An "on-off" switch associated with the equipment is not shown. Power source 13 is illustrative of a typical single phase 120 V.A.C., 60 Hz, 15 ampere wiring system branching from a fused switch box (not shown) to serve receptacle 16. Source 13 may be the between-the-wall wiring in a building, and includes line bus 25, neutral bus 26 and ground bus 27. Neutral bus 26 is connected to the power system ground 24 by way of the grounding of the neutral at the secondary of the usual three-phase power transformer. Ground bus 27 is connected to the power system ground by way of grounding the bus on location. As a consequence of this arrangement, there is a low impedance path between buses 26 and 27 which is represented by large valued capacitor designated by reference numeral 28. Line bus 25 is thus held to a potential of 120 V.A.C. with respect to buses 26 and 27.

Normally, jumper wires 25', 26' and 27' would be spliced to each of buses 25, 26 and 27 to connect line contact 29, neutral contact 30 and ground contact 31 of wall-mounted receptacle 16 directly to the corresponding buses of the power source. When power cable 15 is of the two-lead variety and a plug (not shown) is properly inserted into the receptacle, plug contact 32 electrically connects line lead 33 of the cable to line contact 29, and plug contact 34 electrically connects neutral lead 35 to neutral contact 30. In the absence of module 14, the power line voltage is, at all times, applied across contacts 29 and 30, and hence across load 12 when cable 15 is plugged into the receptacle. An insulation failure in the equipment results in an electrical coupling (represented by impedance 39) between the internal wiring and components of the load, on the one hand, and the chassis, on the other hand. As a consequence of such coupling, leakage power current at 50 to 60 Hz will flow through a ground fault designated by resistance 110 into the power system ground 24. Such ground fault is representative of a grounded person touching a defective piece of electrical equipment. Depending upon the degree of coupling, a potentially dangerous electrical shock hazard exists. It is the function of module 14, interposed between buses 25, 26 and 27, and load 12 to detect the occurrence of a ground fault and rapidly act to disconnect the load from the power source before fatal injury occurs.

Figure 2:
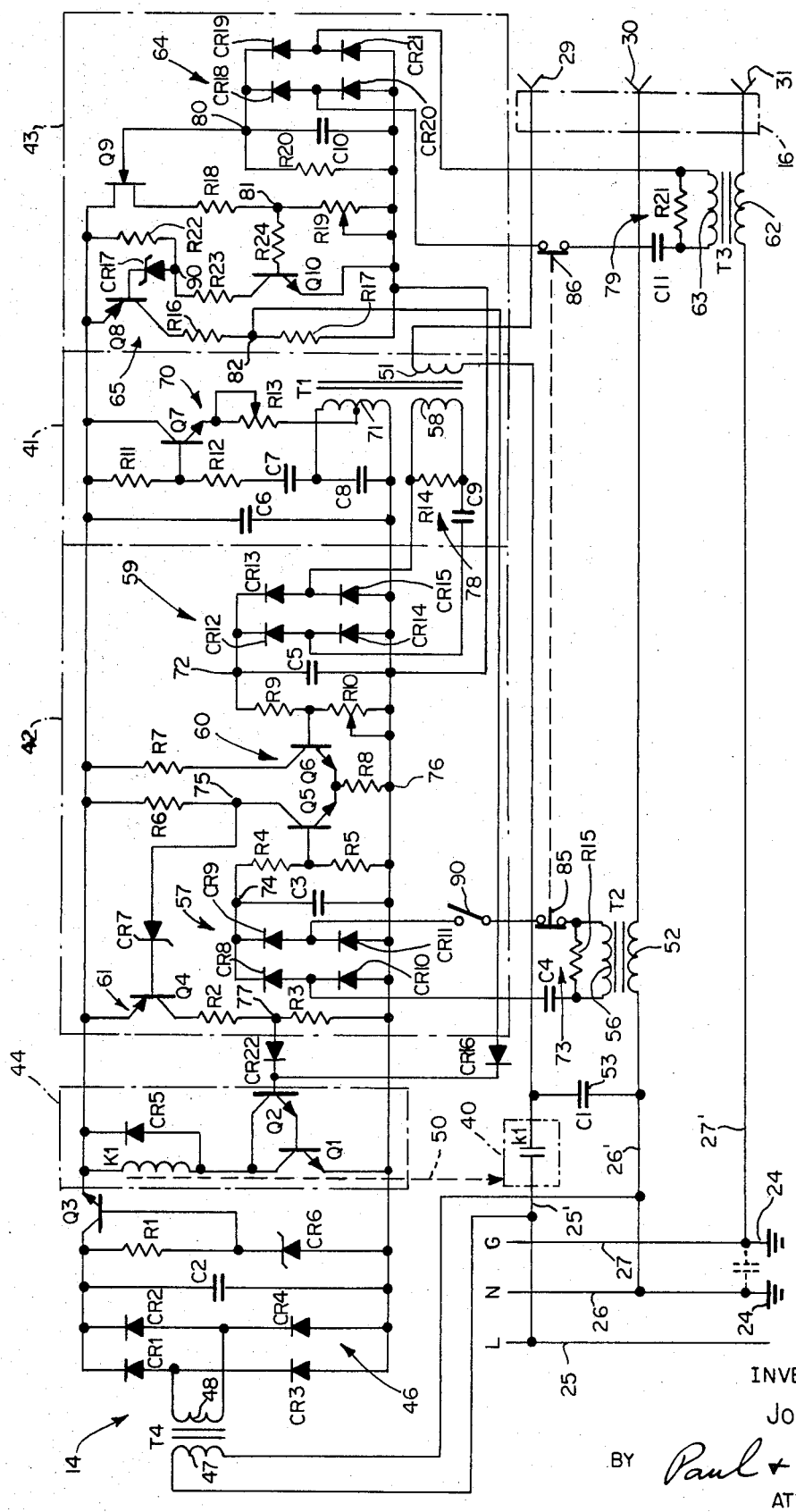
FIG. 2 is a wiring schematic showing details of the block diagram of FIG. 1.

Module 14 comprises power switch means 40, RF signal generator 41, fault supervision means 42, continuity supervision means 43 and two-state control means 44. Details of these components are shown in FIG. 2 which will be referred to after the operation of the components is generally explained making reference to the block diagram of FIG. 1. In general, power switch means 40 is either "enabled" (e.g., bus 25 is connected to contact 29) or "disabled" (e.g., bus 25 is disconnected from contact 29) by reason of link 50 with two-state control means 44. When control means 44 is in its second state, link 50 disables switch means 40; but when the control means is in its first state, link 50 enables switch means 40. Operation of the control means by either supervision means 42 or 43 switches the control means from its first to its second state.

When two-lead cable 15 is plugged into receptacle 16, transformer T1 permits a part of the output of RF signal generator 41 to be injected into load 12. The closed circuit for secondary 51 of transformer T1 includes line contacts 29 and 32, lead 33 of cable 15, load 12, lead 35 of cable 15, neutral contacts 30 and 34, primary 52 of transformer T2 and coupling capacitor 53 connected across jumper leads 25' and 26'. RF choke 54 prevents the injection of the RF signal into the power source and hence precludes interference of one module with the operation of another module connected to the same bus system. The frequency of generator 41 is ultrasonic to the range from 20 KHz to 300 KHz, with the preferable frequency being about 100 KHz.

For a two-lead cable, the connection shown by broken line 55 does not exist, so that only a very small amount of RF current will flow in jumper 27'. In the absence of a ground fault, essentially all of the RF current flowing in the primary 51 of transformer T1 will flow through primary 52 of transformer T2. Secondary 56 of transformer T2 is applied to rectifier-filter 57 which produces an output functionally related to the level of RF current flowing in the portion of the first jumper lead 26' between capacitor 53 and load 12. Secondary 58 of transformer T1 is applied to rectifier-filter 59 which produces an output functionally related to the level of RF current injected into load 12 via the second jumper lead 25'. The outputs of rectifier-filters 57 and 59 are applied to each input of differential amplifier 60 whose output is applied to control circuit 61.

In the absence of a ground fault, the inputs to differential amplifier 60 will be equal and control circuit 61 will permit control means 44 to remain in its first state whereby link 50 enables power switch means 40. When a ground fault occurs, some of the RF current formerly flowing through lead 35 is diverted through impedance 39 and chassis 11 into fault 110. The diverted current flows through ground 24 and is coupled from ground bus 27 to neutral bus 26 through impedance 28 where it enters jumper 26' and capacitor 53. When the RF current flowing through primary 52 decreases below a predetermined level, the reduced output of rectifier filter 57 is such as to unbalance differential amplifier 60 causing control circuit 61 to operate control means 44 and disable switch means 40.

The above description shows how fault supervision means 42 is effective to monitor the potentially dangerous situation that arises when there is significant coupling between the load and the chassis, as for example, when an insulation failure occurs in portable electrical equipment provided with a conventional two-lead power cable. As soon as the chassis is grounded by a person touching the chassis, supervision means 42 is effective to cause operation of the control means 44 disabling the switch means 40 and protecting the person from a possibly lethal shock.

In an effort to provide personnel protection, some electrical equipment is provided with three-lead power cables. The use of such a cable is illustrated in FIG. 1 where lead 55 represents the ground conductor of a standard three-lead power cable. Lead 55 is electrically connected to the chassis at connection 38 and to ground contact 36 of the power cable plug. When lead 55 is present and connection 38 is sound, an alternate path is provided for RF current injected into load 12 by generator 41. Such path includes the coupling between the conductors 33, 35 and ground conductor 55 and between the load and the chassis, this coupling being essentially capacitive in value and being represented by coupling capacitor 45. RF current is thus diverted from primary 52 of transformer T2 and flows through connection 38, lead 55, ground contacts 31, 36, primary 62 of transformer T3 in the third jumper 27' of the module to ground bus 27, through coupling capacitor 28 to neutral bus 26, and through jumper 26' to coupling capacitor 53. The resultant decrease in RF current through primary 52 unbalances differential amplifier 60 and would, in the absence of continuity supervision means 43, disable the power switch means. However, the secondary 63 of transformer T3 of supervision means 43 is applied to rectifier filter 64 whose output is functionally related to the level of RF current flowing in ground jumper 27'. Such level is dependent upon the quality of the ground connection afforded by ground lead 55 of the three-lead power cable.

The output of filter 64 is applied to control circuit 65 which overrides the effect of control circuit 61 (due to the unbalance of differential amplifier 60) and prevents operation of control means 44 until the RF current flowing in ground jumper 27' decreases below a predetermined level. When this level is reached, control circuit 65 operates control means 44 to disable the power switch means.

Continuity supervision means 43 is thus effective to monitor the potentially dangerous situation that arises when a discontinuity occurs in the ground connection in equipment powered by a three-lead cable. When such a discontinuity occurs, or stated otherwise, when the quality of the ground connection becomes so poor as to create a danger in the event of equipment failure, supervision means 43 causes the control means to operate thus disabling the power switch means and shutting down the equipment until the defect is corrected.

Details of the preferred circuitry of module 14 are shown in FIG. 2 to which reference is now made. The power supply for module 14, omitted from the block diagram of FIG. 1 for purposes of simplification, includes transformer T4 and Zener regulated power supply 46. Primary 47 of transformer T4, connected directly across line jumper 25' and neutral jumper 26', is energized at all times to provide about 12 V.A.C. (RMS) across the secondary 48 which is rectified and filtered and applied to a resistor/Zener shunt that properly biases emitter follower Q3. The conduction of transistor Q3 provides power for RF generator 41, supervision means 42 and 43, and two state control means 44.

A. Operation with two-lead power cable (No ground fault)

When a two-lead plug is inserted into receptacle 16, load 12 is connected across terminals 29, 30; and terminal 31 is open.

1. Operation of Generator 41

Generator 41 comprises feedback oscillator 70 which develops a 100 KHz sine-wave signal across the tuned tank in the emitter-base circuit of transistor Q7. The tank circuit includes the primary and feedback windings 71 of transformer T1. One of the secondary windings 51 of this transformer is constituted by a few turns of wire heavy enough to carry rated 60 Hz load current for the receptacle, since this winding is in series with line jumper 25'. The signal appearing across the secondary is about 2 volts, peak-to-peak at 100 KHz; and the RF current injected into load 12 is from 10 to 50 microamperes. As indicated previously, most of this current flows into that portion of neutral jumpers 26' between coupling capacitor 53 and the load (termed the second lead for reference purposes), and passes through primary winding 52 of transformer T2 in neutral lead 26' (termed the first lead for reference purposes).

2. Operation of Sensing Means 42

A part of the output of oscillator 70 is coupled by auxiliary winding 58 of rectifier-filter 59. R-C attenuator 78 attenuates any 60 Hz signal developed in winding 58 by reason of the 60 Hz power current flowing in winding 51. The output of rectifier-filter 59, taken at node 72, is functionally related to the level of RF signal injected into the load. Such output, constituting a reference against which the output of rectifier-filter 57 can be compared in differential amplifier 60, is applied to the base of transistor Q6 which constitutes one input to the differential amplifier. RF current flowing through the load and into neutral lead 26' is coupled, via windings 52 and 56 of transformer T2, into rectifier-filter 57. R-C network 73 serves to attenuate 60 Hz power current whereby the output of rectifier filter 57 at node 74 is, for all practical purposes, directly related to the RF current injected into the load in the absence of a ground fault. Node 74 is connected via resistor network R4, R5 to the base of transistor Q5 which constitutes the second input to differential amplifier 60. Under the conditions of no ground fault, differential amplifier 60 can be balanced by suitable adjustment to potentiometer R10. On balance, transistors Q6 and Q7 will conduct equally; and the voltage at node 75 in the collector of transistor Q5 is slightly more than the emitter voltage, which is about 2 volts above the voltage of bus 76.

When differential amplifier 60 is balanced, Zener diode CR7 will be reverse biased by reason of the operation of transistor Q4 which is of the p-n-p type, and is the active element of control circuit 61. Diode CR7 will thus act as a potential source holding the voltage at the base of transistor Q4 at a voltage slightly higher than the voltage at node 75, but below the emitter voltage of the transistor. The emitter-base junction of the transistor is thus forwardly biased and the transistor is in saturation applying the full power supply voltage across series resistors R2 and R3.

The resultant current flow through these resistors maintains the voltage at node 77 between the resistors at a few volts above the potential of bus 76. Diode CR22, connecting node 77 to the base of tandem transistors Q1, Q2 is forwardly biased.

3. Operation of Control Means 44

Control means 44 comprises relay coil K1 in the collector circuit of tandem transistors Q1, Q2. The forwardly biased diode CR22 supplies base current to transistor Q2 with the result that transistors Q1, Q2 conduct causing current from the power supply to flow through relay coil K1. When transistors Q1, Q2 conduct, control means 44 is in its second state, enabling power switch means 40. Link 50 is representative of the coupling between coil K1 and relay contact k1 of power switch means 40.

4. Operation of Power Switch Means 40

Switch means 40 is constituted by normally open contacts k1 connected serially in jumper lead 25'. Only when current flows through relay coil K1 are contacts k1 closed. In such case, the switch means is enabled and line bus 25 is connected to line contact 29.

5. Summary of Operations

For this state of affairs, the following chart summarizes the status of the various components described above:

| Component | Status |
|---|---|
| Supervision Means 42 | inoperative |
| differential amplifier 60 | balanced |
| CR7 | reverse biased |
| Q4 | saturated |
| CR22 | forwardly biased |
| Control Means 44 | second state |
| Q1, Q2 | conducting |
| coil K1 | energized |
| Power Switch Means 40 | enabled |
| contacts k1 | closed |

B. Operation with two-lead power cable (With ground fault)

When a ground fault occurs, a portion of the RF current injected into the load by generator 41 will be diverted from lead 26' into the fault. The resultant reduction of RF current in neutral jumper 26' below a predetermined level will reduce the output of rectifier-filter 57 sufficiently to unbalance differential amplifier 60.

1. Operation of Sensing Means 42

As the voltage at node 74 decreases, the current flow through series resistors R4, R5 decreases causing the voltage at the base of transistor Q5 to drop. This reduces the conduction level of the transistor causing a reduction in its emitter current which tends to reduce the voltage drop across resistor R8. The incipient reduction in emitter voltage drives transistor Q6 harder such that the emitter voltage remains stable accentuating the reduction in the level of conduction of transistor Q5. The resultant reduction in current through collector resistor R6 raises the voltage at node 75 relative to bus 76 to a level at which the voltage at the base of transistor Q4 (which is about 0.7 volts below the power supply voltage) is less than the voltage at node 75. As a consequence, Zener diode CR7 is no longer reverse biased; and conduction of transistor Q4 stops because its emitter-base junction is no longer forwardly biased.

2. Operation of Control Means 44

When transistor Q4 of control circuit 61 stops conducting, the voltage at node 77 drops to the level of bus 76, diode CR22 is no longer forwardly biased, and the conduction of tandem transistors Q1 and Q2 is halted. The control means is thus switched from its first state to its second state when transistor Q4 stops conducting. Diode CR5 damps the ringing of relay coil K1 when conduction of transistors Q1, Q2 stops; and link 50 to relay contacts k1 is broken. Control means 61 is thus responsive to the output of differential amplifier 60 for operating the control means.

3. Operation of Switch Means 40

When control means 44 is operated and link 50 is broken, relay contacts k1 return to their normally open position. Line bus 25 is thus disconnected from line contact 29 and power to the load is removed. Switch means 40 is thus disabled by operation of control means 44.

4. Summary of Operations

For this state of affairs, the following chart summarizes the status of the various components:

| Component | Status |
|---|---|
| Supervision Means 42 | operative |
| differential amplifier 60 | unbalanced |
| CR7 | forward-biased |
| Q4 | cut-off |
| CR22 | reverse biased |
| Control Means 44 | first state |
| Q1, Q2 | cut-off |
| coil K1 | de-energized |
| Power Switch Means 40 | disabled |
| contacts k1 | open |

From the above description, supervision means 42 can be described as being responsive to the level of RF current in the portion of jumper 26' (first lead) located between capacitor 53 and the load for operating control means 44 when the last mentioned RF current decreases below a predetermined level.

C. Operation with three-lead power cable (Ground Continuous)

When a three-lead plug is inserted into receptacle 16, ground contact 36 on the plug engages normally closed Microswitch 90 mounted in the receptacle. Complete insertion of the plug serves to open switch 90 and disconnect rectifier-filter 57 from winding 56 of transformer T2. With this mechanical interlock arrangement, differential amplifier 60 is unbalanced upon insertion of a three-lead plug into the receptacle. Under these conditions, supervision means 42 would normally cause control means 44 to operate, but supervision means 43 overrides the effect of supervision means 42 when a continuous low impedance path exists from connection 38 through conductor 55, and ground jumper 27' to ground bus 27.

1. Operation of Generator 41

Generator 41 injects a 100 KHz sine-wave signal into load 12. In view of coupling 45 between the leads of the power cable and between the load and the chassis, RF current flows into ground jumper 27'.

2. Operation of Sensing Means 43

RF current and power line current flowing in jumper 27' passes through primary winding 62 of current transformer T3. R-C network 79 shunting secondary winding 63 attentuates any leakage power current in jumper 27' but passes any 100 KHz signal present. The last mentioned signal is applied to rectifier-filter 64 whose output at node 80 is applied to the source lead of n-channel field effect transistor (F.E.T.) Q9. When the RF current in ground jumper 27' exceeds a predetermined value, transistor Q9 is properly biased for conduction causing current to flow from the power supply 46 through the series combination of resistors R18 and R19. The voltage at node 81 is established by the setting of potentiometer R19, but will be at a level above the potential of bus 76.

Transistor Q10, under these circumstances will be properly biased for conduction and will operate in its saturated state. The resultant flow of current through transistors R22 and R23 will drop the voltage at node 90 between these resistors to a level significantly below the emitter voltage of transistor Q8 which is of the p-n-p type. The emitter-base junction of transistor Q8 will be forwardly biased as a consequence placing the base at a higher voltage than node 90. Zener diode CR17 is thus reverse biased and will act as a voltage source interconnecting the base of transistor Q8 with node 90 and holding the base a voltage slightly higher than the voltage at node 90, but below the emitter voltage of the transistor. Thus, transistor Q8 will conduct and operate in its saturated state applying full power supply voltage across series resistors R16 and R17. The voltage at node 82 between these resistors, due to the resultant current flow, is a few volts above the potential of bus 76. Diode CR16, connecting node 82 to the base of tandem transistors Q1, Q2 is thus forwardly biased.

3. Operation of Sensing Means 42

Switch 90, being held open by reason of the insertion of the three-contact plug into the receptacle, causes differential amplifier 60 to be unbalanced. This situation results in transistor Q4 being "off" and node 77 being at the potential of bus 76. In such case, diode CR 22 is no longer forwardly biased; and, in the absence of the conduction of transistor Q8 of control circuit 65, tandem transistors Q1, Q2 would be cut-off thus operating control means 44 and disabling power switch means 40. Control circuit 65, however, overrides control circuit 61.

4. Operation of Control Means 44

Forwardly biased diode CR16 supplies base current to transistor Q2 (independently of the state of transistor Q4) with the result that transistors Q1, Q2 conduct causing current from the power supply to flow through relay coil K1. Thus, control means 44 is held in its first state by the conduction of transistor Q8 of control circuit 65.

5. Operation of Power Switch Means 40

When control means 44 is in its first state, link 50 causes contacts k1 to be closed thus enabling the switch means.

6. Summary of Operations

As long as the RF current in ground jumper 27' exceeds a predetermined value, the status of the various components will be as follows:

| Component | Status |
|---|---|
| Supervision Means 42 | operative |
| Supervision Means 43 | inoperative |
| F.E.T. Q9 | conducting |
| Transistor Q9 | saturated |
| Diode CR17 | reverse biased |
| Transistor Q8 | saturated |
| Diode CR16 | forwardly biased |
| Control Means 44 | second state |
| Transistors Q1, Q2 | conducting |
| Coil K1 | energized |
| Power Switch Means 40 | enabled |
| Contacts k1 | closed |

D. Operation with three-lead power cable (Ground Discontinuous)

When connection 38 deteriorates producing a high impedance node, or when a break occurs in ground conductor 55, or, for some reason, there is a poor connection between ground contacts 31 and 36, a discontinuity exists in the low impedance path from chassis 11 to ground 24. Such discontinuity reduces the RF current flowing in ground jumper 27'.

1. Operation of Sensing Means 43

A reduction in the level of RF current flowing in ground jumper 27' causes a corresponding reduction in the output of rectifier-filter 64. When the RF current falls below a predetermined level, the voltage at node 80 drops below the value necessary to maintain conduction of transistor Q9. As this transistor reaches cut-off, the voltage at node 81 drops to the potential of bus 76.

When the voltage at the base of transistor Q10 reaches the potential of bus 76, the transistor will switch from its saturated state to a non-conducting state raising the voltage at node 90 to the power supply voltage. Zener diode CR17 will no longer be reverse biased, and transistor Q8 will stop conducting. The halt in the flow of current through resistors R16, R17 will drop the voltage at node 82 to the potential of bus 76. Diode CR16 will no longer be forwardly biased.

2. Operation of Control Means 44

Recalling that differential amplifier 60 is unbalanced by reason of the effect of the mechanical interlock associated with switch 90, diode CR22 is not forwardly biased depriving tandem transistors Q1, Q2 of base current from transistor Q4. Base current furnished by diode CR16 will stop as soon as this diode is no longer forwardly biased, with the result that conduction of tandem transistors Q1, Q2 is halted. Control means 44 is thus switched from its first state to its second state causing a break in link 50 to relay contacts k1.

E. Overload trip adjustment (line shorted to neutral and/or ground conductor)

A defect in the power cable, or an insulation failure in the load, can result in accidental and unwanted contact between the line and neutral conductors of the cable. A fuse or circuit breaker normally protects the equipment against the resultant dangerous flow of power current from the source. More sensitive protection against defects of this nature, however, is provided by RF generator 41 because it will automatically switch to a quiescent state when a low impedance (contact between line and neutral conductors) is shunted across secondary winding 51 of transformer T1.

Oscillator 70 of generator 41 is of the so-called single-ended type wherein variable resistor R13 serves to prevent reverse current flow due to the inductive reactance of the tank circuit formed by capacitor C8 and the emitter primary winding of transformer T1. Resistor R13 also limits the emitter current, so that when the secondary winding 51 is shorted by a low impedance, the resultant large emitter current flowing through resistor 13 will raise the voltage of the emitter of transistor Q7 relative to its base thus interferring with continued oscillation of the circuit. As a consequence, no injection of an RF signal into the cable will take place. This condition is interpreted by supervision means 42 (when a two-lead cable is in use) or by supervision means 43 (when a three-lead cable is in use) as either a ground fault or a ground discontinuity. In either case, the supervision means will be effective to operate the control means and disable the power switch means thus removing power from the load. The potentially dangerous situation has to be corrected before power can be reapplied to the load. Note that the setting of variable resistor R13 will permit an operator to select the level of power current overload at which tripping will occur.

F. Test Feature

In order to determine whether supervision means 42 and 43 are operating properly, manual test switches 85 and 86 are provided. Both switches are of the "normally closed" variety, and both are connected together for simultaneous manual operation. The test mode of module 14 is carried out after a cable is plugged into receptacle 16, and the "on-off" switch of the chassis (not shown) is turned to "on". When a two-lead cable is used and no ground fault is present, sufficient RF current (sometimes termed supervisory current for reference purposes) will be flowing in primary winding 52 of transformer T2 to maintain differential amplifier 60 on its balanced condition. When manual switch 85 is depressed, the secondary winding 56 of transformer T2 is disconnected from rectifier filter 57 causing amplifier 60 to become unbalanced. With these conditions, control circuit 61 should be effective to operate control means 44 and disable the power switch means. Inspection of load 12 will verify whether the various components in supervision means 42 and control means 44 are operating properly.

When a three-lead cable is used and there is no ground discontinuity, sufficient RF current will be flowing in primary winding 62 of transformer T3 to maintain transistor Q9 in its conducting state. When manual switch 86 is depressed, the secondary winding 63 of this transformer is disconnected from rectifier filter 64 causing transistor Q9 to stop conducting. As described above, control circuit 65 should be effective under this condition to operate control means 44 and disable the power switch means. As was the case with the testing when a two-lead cable is used, inspection of load 12 will verify whether the components involved are operating properly.

G. Modifications

1. RF Signal Injection

While the RF signal is shown and described as being injected into line jumper 25', it is also possible to inject such signal into neutral jumper 26' at a point between capacitor 53 and neutral contact 30. In such case, the flow of supervisory current would be monitored in line jumper 25' rather than neutral jumper 26'.

2. Solid State Power Switch Means

Power switch means 40 is shown in FIG. 2 as an electrimechanical device. Conventional solid state switches could be substituted wherein properly triggered SCR devices would be used in place of relay contacts k1.

Instead of mounting the components of module 14 in a receptacle into which the plug of a power cable is inserted, selected portions can be incorporated directly into a piece of electrical equipment. When the equipment is provided with a two-lead power cable, those components required are switch means 40, generator 41, supervision means 42 and control means 44. Equipment so provided would be disconnected automatically from the power source when a ground fault occurs.

When the equipment is provided with a three-lead power cable, supervision means 43 would be substituted for supervision means 42. In such case, the equipment would be disconnected automatically from the power source when a discontinuity occurs in the ground connection.

3. Incorporation into Auxiliary Module

Instead of mounting module 14 in the housing of a wall receptacle, it is possible to mount the components in an adapter as shown in FIG. 3. Such adapter is provided with two male contacts for mating with the line and neutral contacts of a conventional wall receptacle, and either a third male contact to mate with the ground contact if the wall receptacle is so provided, or a flexible lead which can be connected to the power source ground. The exposed female contacts of the module could receive either a two-prong plug or a three-prong plug. The advantage of this approach is that the adapter module can be used with existing receptacles and would serve to convert them to safe power sources.

H. Other Embodiment

1. Two-Wire System

Figure 4:
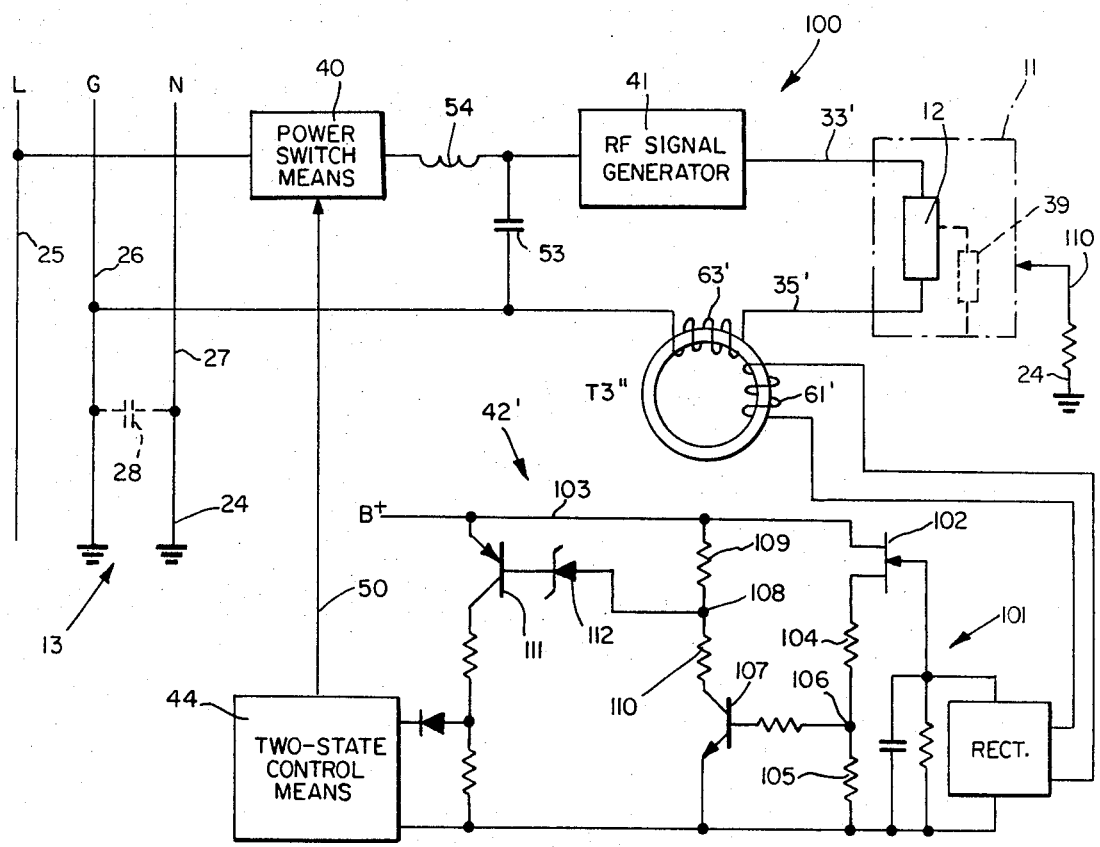
FIG. 4 is a block diagram of a modified version of the invention.

A modification of the invention suitable for providing ground fault protection in a two-wire single phase system is shown in FIG. 4 wherein monitor means 100 is interposed between electrical load 12 mounted in chassis 11 and grounded power source 13. In this case, a conventional two conductor power cable containing line lead 33' and neutral lead 35' is used without the ground conductor shown in previous embodiment. The conventional plug/receptacle for the power cable is not shown to simplify the drawing.

Load 12 and chassis 11 may be any type of portable electrical apparatus normally powered by a two-conductor cable. The function of monitor means 100 is to detect the occurrence of a ground fault and disconnect power before the ground fault is fatal. Such a ground fault will occur when a grounded object accidentally touches chassis 11 in the presence of a considerable amount of coupling between the leads 33', 35' and the chassis 11, and between the circuitry in load 12 and the chassis. The coupling may arise due to the capacitance between the load and the chassis, insulation failure, etc. Impedance 39 is symbolic of the coupling with the result that chassis 11 floats at some voltage relative to ground.

If a person in contact with the power system ground touches the chassis when considerable coupling is present, current flows from the chassis, through the person, to ground. This situation, illustrated by resistor 110 connected between chassis 11 and the power source ground 24, is termed a "ground fault".

Monitor means 100, which detects the occurrence of a ground fault, includes power switch means 40, RF signal generator 41, ground continuity supervision means 42', control means 44 and associated interconnection circuitry. In the absence of a ground fault, signal generator 41, which is connected between line bus 25 and the load, produces a 100 KHz signal which flows from the signal generator through lead 33', load 12, lead 35' and primary 63' of transformer T3", and coupling capacitor 53 back to the generator. Note that RF choke 54 keeps the RF signal out of the power source.

Supervisory current flowing in primary 63' is transformed and applied via secondary 61' to supervision means 42' which insures that control means 44 will be in its first state, and power switch means will be enabled thus powering load 12.

When a ground fault occurs, a portion of the RF signal injected into line lead 33' will be coupled to the chassis through impedance 39 causing RF current to flow through resistor 110 to ground 24. The complete circuit path for this situation comprises lead 33', load 12, impedance 39, chassis 11, resistor 110, ground 24, ground 24 in the ground bus 27, effective coupling capacitor 28, neutral bus 26, the neutral lead connected to bus 26, and coupling capacitor 53 back to generator 41. As a consequence, the flow of supervisory current in primary 63' is diminished by the amount of RF current flowing through the ground fault. The latter has a value dependent upon impedance represented by the fault. When the supervisory current in primary 63' falls below a predetermined level, supervision means 42' will operate control means 44 switching it to its second state thus disabling switch means 40 and disconnecting power from load 12.

In the operation of supervision means 42', the output of secondary winding 61' of current transformer T3'' due to the flow of supervisory current in the primary is applied to rectifier filter 101. In the absence of a ground fault, the output of rectifier-filter 101 provides sufficient bias to cause field effect transistor 102 to conduct thus applying the power supply voltage at bus 103 across series resistors 104, 105. The voltage at node 106 between these resistors is thus above the potential of bus 76 and the emitter-base junction of transistor 107 is forwardly biased. The resultant saturation of this transistor places the voltage at node 108, between resistors 109 and 110, at a level below the base voltage of transistor 111. As a consequence, Zener diode 112 is reverse biased holding the base of transistor 111 at a voltage that forwardly biases the transistor. Transistor 111 and its associated resistors operate like control circuit 61 to hold control means 44 in its first state at which the power switch means is enabled.

When a ground fault occurs, transistor 102 no longer receives sufficient bias and conduction ceases. The voltage at node 106 drops to the potential of bus 76 reverse-biasing the emitter base junction of transistor 107. The resultant halt in conduction raises the voltage at node 108 to the potential of bus 103 causing the emitter-base junction of transistor 111 to be reverse biased and further conduction of this transistor to halt. As previously described, this action operates the control means switching it to its second state at which the power switch means is disabled.

2. Two or Three Wire System

Figure 5:
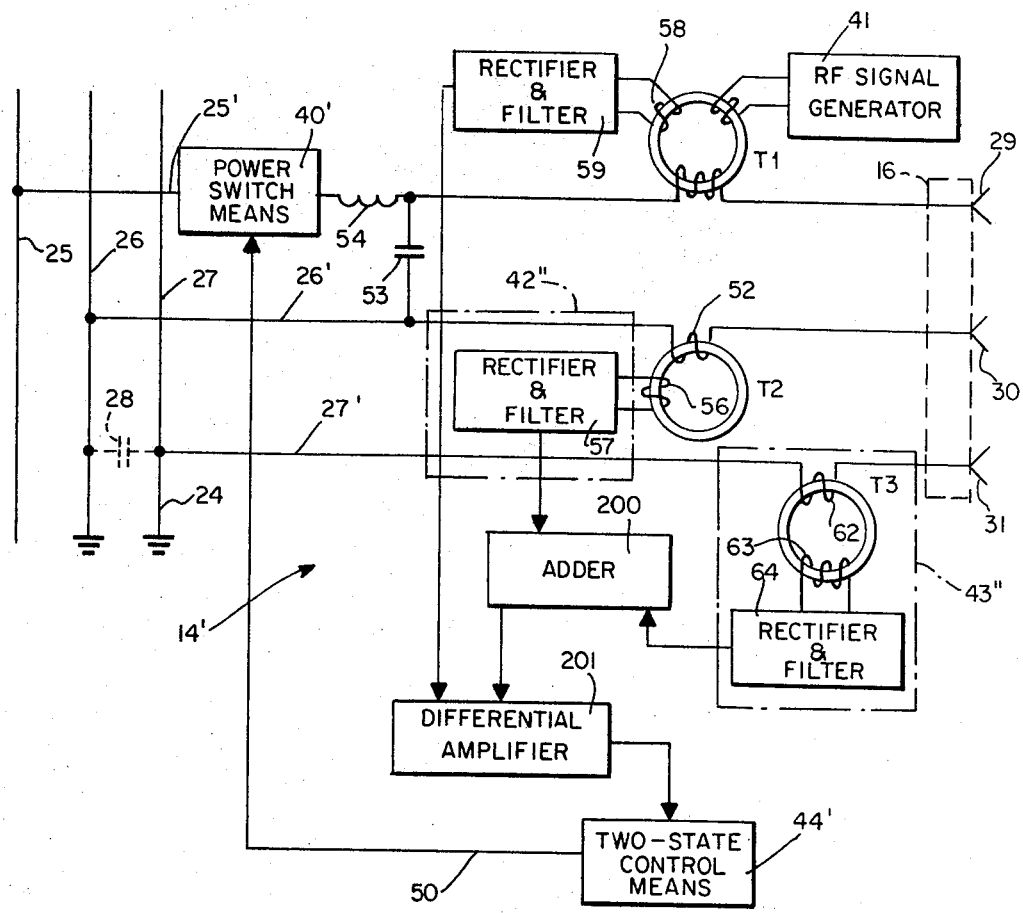
FIG. 5 is a block diagram of a second modification of the invention.

Reference numeral 14' in FIG. 5 designates a module associated with three-contact receptacle 16, and capable of responding to ground faults when either a two-contact or a three-contact plug is employed. Module 14' eliminates the requirement for the mechanical interlock shown in the embodiment of FIG. 1.

Module 14' comprises power switch means 40', RF signal generator 41, fault supervision means 42'', continuity supervision means 43'', adder circuit 200, differential amplifier 201 and two-state control means 44'. Control means 44 operates on power switch means 40 as described previously.

When a two-contact plug is inserted into receptacle 16, an electrical load (not shown) is connected across contacts 29 and 30, while contact 31 is open. Supervisory current from generator 41 is injected into the load via transformer T1, and flows in primary winding 52 of transformer T2 in the absence of a ground fault. Essentially no supervisory current flows in winding 62 of transformer T3. Consequently, the outputs of rectifier filters 57 and 64, when combined in adder 200 and applied to one input of amplifier 201, will balance the output of rectifier filter 59 applied to the other input of the amplifier. Control means 44' will remain in its first state whereby link 50 enables power switch means 40'. When a ground fault occurs, some of the supervisory current injected into the load will be diverted from primary winding 52 of transformer T3, as previously described in connection with the operation of the embodiment shown in FIG. 1. If the fault is such as to reduce the supervisory current flowing through primary 52 below a predetermined level, the reduced output of rectifier filter 57 will cause the output of adder 200 to unbalance amplifier 201 and operate control means 44'. Switch means 40 is thus disabled when a ground fault occurs.

When a three-contact plug is inserted into receptacle 16, an electrical load (not shown) is connected across contacts 29 and 30, and a conductor (not shown) couples contact 31 to the load through the chassis (not shown). Supervisory current injected into the load by reason of generator 41 will flow in winding 52 of transformer T2 and in winding 62 of transformer T3. In the absence of a ground fault and if continuity exists in the connection of the ground conductor to the chassis, the combined outputs of rectifier filters 57 and 64 will provide an input to amplifier 201 sufficient to maintain its balance. Thus, the level of supervisory current flowing through winding 52 is reduced when a three-contact plug is used, as compared to the situation when a two-contact plug is used; but such reduction is compensated for by the increased level of supervisory current flowing through winding 62.

When a ground fault occurs, supervisory current is diverted to ground reducing the output of adder 200 and unbalancing amplifier 201. As previously described, this situation results in the operation of control means 44' and the disabling of power switch means 40'.

When a break occurs in the ground continuity, for example, when a conductor breaks in the power cable or the conductor/chassis connection deteriorates, such break acts as an impedance to the flow of the supervisory current in winding 62 of transformer T3. Consequently, there is a reduction in the flow of supervisory current in winding 62 and a resultant decrease in one input to amplifier 201 which is thereby unbalanced. Control means 44' is thus operated to disable switch means 40'.

From the above description, the embodiment of the invention shown in FIG. 5 is capable of detecting ground faults when either a two-lead or a three-lead power cable is used, and is also capable of monitoring the continuity of the ground connection when a three-lead cable is used. No mechanical interlock is necessary in this embodiment by reason of adder 200 which applies the sum of the outputs of rectifier filters 57 and 64 to one input of the differential amplifier.

Figure 6:
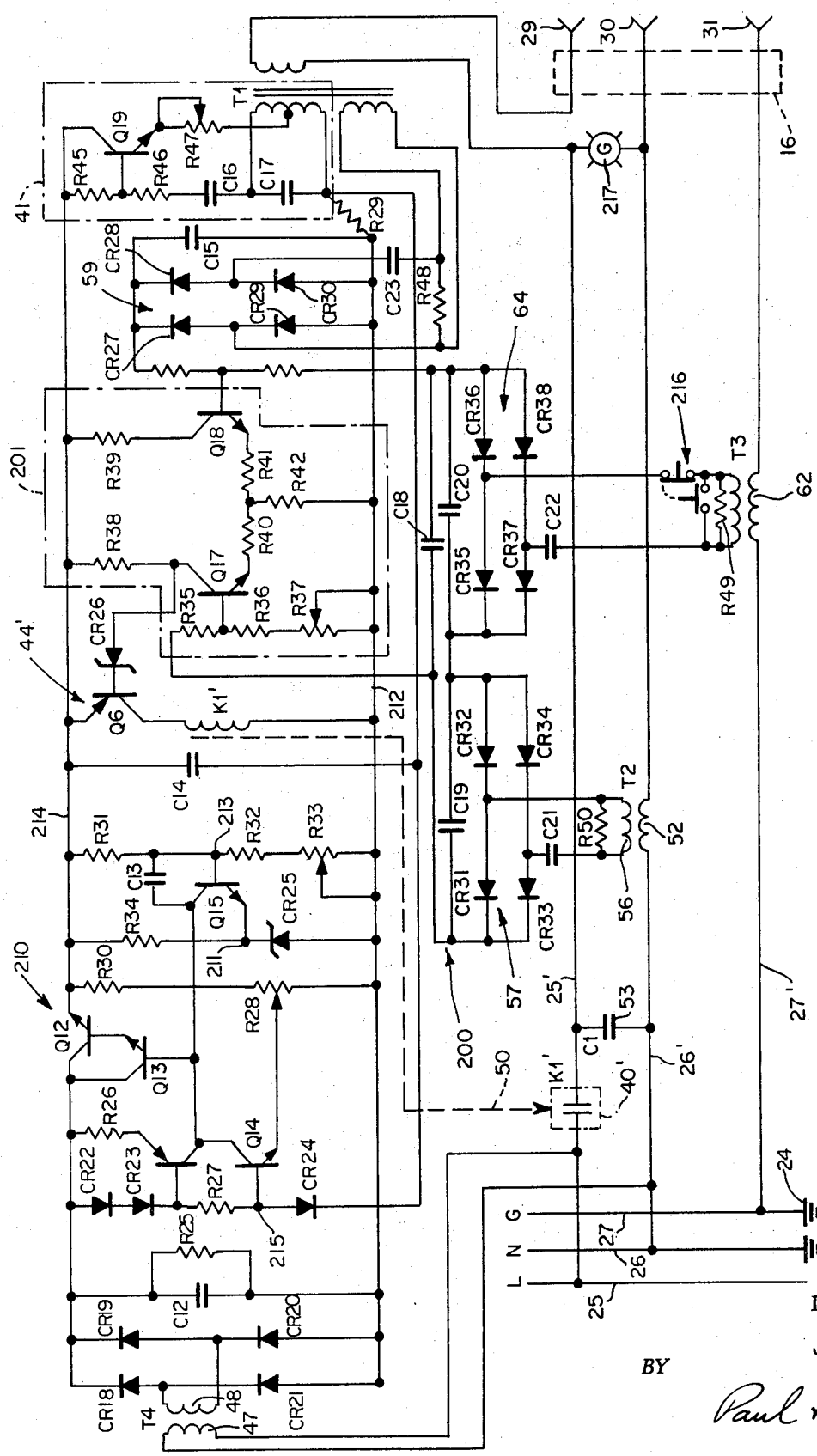
FIG. 6 is a wiring schematic showing details of the block diagram of FIG. 2.

Details of the preferred circuitry of module 14' are shown in FIG. 6 to which reference is now made. The power supply for module 14', omitted from the block diagram of FIG. 5 for purposes of simplification, includes transformer T4, and series voltage regulator 210. Primary winding 47 of transformer T4 is connected directly across line jumper 25' and neutral jumper 26' and is energized at all times to provide about 14 V.A.C. (RMS) across secondary winding 48. This voltage is rectified, filtered and applied across the series combination of double diodes CR22, CR23, resistor R27, diode CR14 and resistor R29. The flow of current in such combination properly biases p-n-p type transistor Q11 which conducts and, under normal conditions supplies base current to tandem transistors Q12, Q13, and collector current to transistors Q14 and Q15.

Both transistors Q14 and Q15 are normally biased for conduction. Current flowing through resistor R34 reverse-biases Zener diode CR25 and holds node 211 at the emitter of transistor Q15 at a voltage above the potential of bus 212 at a value equal to the breakdown voltage of the diode. The current flowing through series resistors R31, R32 and R33 holds node 213 at the base of transistor Q15 at a pre-selected voltage greater than the voltage at node 211 by reason of the setting of potentiometer R33. Thus, the base-emitter junction of transistor Q15 is forwardly biased and conduction occurs as long as collector current is furnished by transistor Q11. This transistor provides for the voltage regulation of the power supply.

As to transistor Q14, its emitter is held at a preselected voltage above the potential of bus 212 by the setting of potentiometer R28 which is in series with resistor R30 connected across buses 212 and 214. Node 215 at the base of this transistor is held at a voltage above the potential of bus 212 by reason of the voltage drops across diode CR14 and resistor R29. Note that the current through resistor R29 has a component contributed by the current flowing through oscillator 41. Hence, the voltage at node 215 will be dependent upon the degree to which the oscillator is driven. By properly setting potentiometer R28, transistor Q14 will always be forwardly biased, but the degree to which it conducts will be directly related to the degree to which the oscillator is driven. When the output of the oscillator reaches a predetermined maximum level, the flow of current in resistor R29 will forwardly bias transistor Q14 to such a degree that most of the current furnished by transistor Q11 will flow into the collector of transistor Q14 thus depriving transistors Q12, Q13 of base current. As conduction of these transistors is reduced, the current flow through series resistors R28 and R30 decreases thus reducing the emitter voltage of transistor Q14 relative to its base voltage. As a consequence, the transistor is driven even harder depriving transistors Q12, Q13 of even more base current. This regenerative type of feedback rapidly removes power from the oscillator when it is overloaded to a predetermined degree. Under normal conditions, however, power supply 210 furnishes power for RF generator 41, supervision means 42'' and 43'', and two-state control means 44'.

When a two-lead power cable is plugged into receptacle 16, contact 31 is open and an electrical load (not shown) is connected across contacts 29, 30. Generator 41 operates as described previously and injects supervisory current into the load by reason of transformer T1. A given percentage of the output of generator 41 is applied through filter-rectifier 59 to the base of transistor Q18 of differential amplifier 201 thus establishing a given degree of conduction of this transistor. Transformer T2 permits supervisory current in jumper lead 26' to be transformed and applied via rectifier filter 57 to the base of transistor Q17. By suitable adjustment to potentiometer R37, the conduction of transistor Q17 can be matched to the conduction of transistor Q18 in the absence of a ground fault. The resultant flow of current in resistor R38 will hold the cathode of Zener diode CR26 at a voltage well below the voltage of bus 214. On the other hand, the anode of the Zener diode will be held just below the voltage at bus 214 by reason of the emitter-base junction drop that occurs in transistor Q16 which is a part of control means 44'. Thus, Zener diode CR26 is reverse biased and transistor Q16 conducts causing current to flow in relay coil K1'. Link 50 between coil K1' and normally open contacts k1' is established by the conduction of transistor Q16 causing the contacts to be closed.

When a ground fault occurs, there is a reduction in supervisory current flow in jumper lead 26' below a predetermined level with the result that the output of rectifier filter 57 is reduced. Transistor Q17 rapidly stops conducting when its bias is thus reduced raising the voltage at the cathode of Zener diode CR26. When this diode is no longer reverse biased, transistor Q16 stops conducting and contacts k1' open disconnecting power from the load. Indicator lamp 217 is thereby extinguished.

When a three contact plug is inserted into the receptacle, a part of the supervisory current injected into the load by generator 41 passes into the ground conductor (not shown) of the power cable and into jumper lead 27'. The output of rectifier filter 57 is thus reduced, but the bias on transistor Q17 remains substantially the same because of the increased output of rectifier filter 64. Note that in this embodiment, the outputs of the rectifier filters associated with the neutral and ground jumpers are added.

When a ground fault occurs, or when a discontinuity on the ground connection (not shown) occurs, the bias on transistor Q17 is reduced. As previously described, this results in a halt in the conduction of transistor Q16 and the opening of contacts k1' to disconnect power from the receptacle.

Manually operable test switch 216 is provided in the secondary of transformer T3 to determine whether the monitor is working properly. When the switch is operated, the series connected normally closed switch is opened, and the shunt connected normally open switch is closed. These switches disconnect the input of rectifier filter 64 from the secondary of transformer T3. If the components are operating properly, the reduction in output of rectifier filter 64 will cause amplifier 201 to become unbalanced and power to be disconnected from the receptacle. Inspection of lamp 217 will indicate whether the module is operating properly. A similiar test switch can be applied to the secondary of transformer T2 if desired.

Transistor Q14 is capable of detecting and protecting against a short circuit in the load, or a situation in which the line conductor comes in contact with the neutral and/or ground conductor in the power cable. Under these circumstances, the secondary of transformer T1 would be effectively shorted causing a significant reduction in the effective load as seen by oscillator 41. The oscillator responds to this situation by producing more supervisory current and drawing more current from power supply 210. The added current, in passing through resistor R29 to bus 212, raises the voltage at node 215, as previously described. By proper selection of components, it is possible to cause the power supply to turn itself off when the current drawn from the power supply reaches a predetermined level. When this event occurs, control means 44' is operated, contacts k1' are opened, and power is disconnected from the receptacle. In the disclosed embodiment, the voltage at bus 214 is about 12 V.D.C., and the maximum load current which the power supply can produce before automatic shutdown occurs is about 40 milliamperes. The RF energy input to the load is thus limited to about 0.5 watts.

Capacitor C14, connected across bus 214 and node 215 serves to absorb the current being furnished by the power supply when the oscillator begins to shut itself down, and to prevent oscillation of the power supply itself.

To summarize the operation of the embodiment of the invention shown in FIGS. 5 and 6, generator 41 injects RF energy into one of three leads which are respectively adapted to connect an electrical load across the line and neutral buses of the power source, and to connect the chassis to the ground bus. Rectifier-filter 59, associated with one of the leads, develops a signal representative of the RF energy injected into this lead. Supervision means 42'' and 43'' associated with the other leads, in cooperation with adder 200, develops an output signal representative of the total RF energy coupled into the other leads. The two signals thus produced are compared in differential amplifier 201 which produces an output when the difference between the two signals is more than a predetermined amount. The output of amplifier 201 operates two-state control means 44' which is effective to disable switch means 40'.

(c) COMPONENT VALUES OF FIG. 6

| Symbol | Component | Value |
| --- | --- | --- |
| R25 | Resistor | as required |
| R26, 34, 42 | Resistor | 1K ohm |
| R27, 38, 39, 48, 49, 50 | Resistor | 10K ohm |
| R28, 33, 47 | Potentiometer | 200 ohm |
| R29 | Resistor | 50 ohm |
| R30, 31 | Resistor | 2.2K ohm |
| R32 | Resistor | 4.7K ohm |
| R35, 36, 43, 44 | Resistor | 100K ohm |
| R37 | Potentiometer | 20K ohm |
| R40, 41 | Resistor | 270 ohm |
| R45 | Resistor | 33K ohm |
| R46 | Resistor | 100 ohm |
| C12 | Capacitor | 250 mfd, 25 V |
| C13 | Capacitor | 0.01 mfd, 15 V |
| C14 | Capacitor | 250 mfd, 15 V |
| C15, 18, 19, 20, 21, 22 | Capacitor | 0.1 mfd, 500 V |
| C15, 17, 23 | Capacitor | 0.01 mfd, 1 KV |
| CR18-24, 27-38 | Diode | 1N4001 |
| CR25 | Zener Diode | 1N754 |
| CR26 | Zener Diode | 1N751 |
| Q11 | Transistor | 2N4248 |
| Q12, 19 | Transistor | 2N3053 |
| Q13, 14, 15, 17, 18 | Transistor | 2N3565 |
| Q16 | Transistor | 2N3638 |

I. COMPONENT VALUES OF FIG. 2

| Symbol | Component | Value |
| --- | --- | --- |
| R1, 8 | Resistor | 1K ohm |
| R2, 16, 18 | Resistor | 2, 2K ohm |
| R3, 17 | Resistor | 4, 7K ohm |
| R4, 5, 9, 10, 13 | Resistor | selected |
| R6, 7 | Resistor | 10K ohm |
| R11 | Resistor | 33K ohm |
| R12 | Resistor | 100 ohm |
| R14, 15, 21 | Resistor | 100K ohm |
| R19 | Resistor | 5K ohm |
| R20 | Resistor | 560K ohm |
| R22 | Resistor | as required |
| R23 | Resistor | as required |
| R24 | Resistor | as required |
| C1 | Capacitor | .01mf, 250V |
| C2, 6 | Capacitor | 200 mf/25V |
| C3, 4, 5, 7–11 | Capacitor | .1mf/25V |
| CR1–5, 8–16, 18–22 | Diode | 10D1 |
| CR6 | Zener Diode | 1N964 |
| CR7, 17 | Zener Diode | 1N751 |
| Q1 | Transistor | 2N3054 |
| Q2, 5, 6 | Transistor | 2N3565 |
| Q3 | Transistor | 40372 |
| Q4, 8 | Transistor | 2N4248 |
| Q7 | Transistor | 2N3053 |
| Q9 | Transistor | 2N5457 |
| Q10 | Transistor | |

What is claimed is:

1. Monitor means associated with the application of power to an electrical load from a source comprising a line bus, a neutral bus, and a ground bus, said monitor means comprising:
   a. a first lead adapted to interconnect said neutral bus to one side of said load, and a second lead adapted to interconnect said line bus to the other side of said load;
   b. a coupling capacitor connected across said leads for providing a low impedance path to RF current;
   c. an RF generator in series with one of said leads between said capacitor and said load to inject an RF signal into said load for causing RF current to flow in the portion of the other of said leads between said capacitor and said load;
   d. operable control means;
   e. supervision means coupled to said portion of said other lead and responsive to the level of RF current therein for operating said control means when the last mentioned RF current decreases below a predetermined level.

2. Monitor means according to claim 1 wherein said supervision means includes a current transformer coupled to said portion of said other lead, a rectifier for rectifying the output of said current transformer, a biasable active device for operating said control means when bias on said device exceeds a predetermined level, and bias means responsive to the output of said rectifier for providing bias to said active device.

3. Monitor means according to claim 1 including power switch means in series with said second lead and responsive to said control means for disconnecting power from said source to said load when said control means is operated.

4. Monitor means according to claim 1 wherein said supervision means includes a differential amplifier having an output and a pair of inputs, first transformer means coupled to said portion of said other lead, first rectifier means for rectifying and applying the output of said first transformer means to one input of said amplifier whereby said one input is functionally related to the level of RF current flowing in said portion of said other lead, second transformer means coupled to said RF generator, second rectifier means for rectifying and applying the output of said second transformer means to the other input of said amplifier whereby said other input is functionally related to the level of RF current injected into said load, and circuit means responsive to the output of said amplifier for operating said control means when said amplifier is unbalanced by reason of a predetermined difference between the level of RF current injected into said load and the level of RF current flowing in said portion of said other load.

5. Monitor means according to claim 4 including power switch means in series with said one lead and responsive to the operation of said control means for disconnecting power from said source to said load.

6. Monitor means according to claim 1 wherein said load has a ground connection associated therewith, said monitor means including a third lead adapted to interconnect said ground bus to said ground connection, second supervision means coupled to said third lead and responsive to the level of RF current therein for preventing operation of said control means until the level of RF current in said third lead decreases below a predetermined level.

7. Monitor means according to claim 6 including means responsive to interconnecting said ground bus to said ground connection for disabling the first mentioned supervision means.

8. Monitor means according to claim 7 wherein said second supervision means includes third transformer means coupled to said third lead, third rectifier means for rectifying the output of said third transformer means, and circuit means responsive to the output of said third rectifier means for operating said control means when the level of RF current in said third lead decreases below a predetermined level.

9. Monitor means according to claim 1 where in the level of the RF signal injected into said load is functionally related to the level of power current drawn from said source.

10. Monitor means associated with the application of power to an electrical load from a source comprising a line bus, a neutral bus, and a ground bus, said monitor means comprising:
   a. a first lead adapted to interconnect said neutral bus to one side of said load, and a second lead adapted to interconnect said line bus to the other side of said load;
   b. a coupling capacitor connected across said leads for providing a low impedance path to RF current;
   c. an RF generator in series with one of said leads between said capacitor and said load to inject an RF signal into said load for causing RF current to flow in the portion of the other of said leads between said capacitor and said load;
   d. operable control means;
   e. first supervision means coupled to said portion of said other lead and responsive to the level of RF current therein;
   f. a third lead adapted to be connected to said ground bus;
   g. second supervision means coupled to said third lead and responsive to the level of RF current therein;
   h. said first and second supervision means being constructed and arranged to operate said control means when, simultaneously, RF current in said portion of said other lead decreases below a predetermined level, and RF current in said third lead decreases below a predetermined level.

11. Monitor means according to claim 10 wherein said first supervision means includes a differential amplifier having an output and a pair of inputs, first transformer means coupled to said portion of said other lead, first rectifier means for rectifying and applying the output of said first transformer means to one input of said amplifier whereby said one input is functionally related to the level of RF current flowing in said portion of said other lead, second transformer means coupled to said RF generator, second rectifier means for rectifying and applying the output of said second transformer means to the other input of said amplifier whereby said other input is functionally related to the level of RF current injected into said load, and circuit means responsive to the output of said amplifier for operating said control means when said amplifier is unbalanced provided RF current in said third lead is below is predetermined level.

12. Monitor means associated with the application of power to a chassis-mounted electrical load from a source including a line bus, a neutral bus, and a ground bus, said monitor means comprising:

a. three leads respectively adapted to connect said load across the line and neutral buses and the chassis to the ground bus;
b. an RF generator for injecting RF energy into one of said leads;
c. rectifier-filter means associated with said one of said leads for developing a signal representative of the RF energy injected thereinto;
d. supervision means associated with the other leads for developing an output signal representative of the total RF energy coupled thereinto; and
e. comparator means to compare said signals for producing an output when the difference therebetween is more than a predetermined amount.

13. Monitor means according to claim 12 wherein said supervision means includes:
a. rectifier-filter means associated with each of said other leads for developing a pair of signals respectively representative of the RF energy in each of said other leads; and
b. means to combine in an additive sense said pair of signals to produce said output signal.

14. Monitor means according to claim 12 wherein said RF generator includes an oscillator and a power supply therefor, and means for turning-off said oscillator when the current drawn by said oscillator from said power supply reaches a predetermined level.

* * * * *